Oct. 21, 1941.                J. S. DONALDSON                2,260,215
                                COUPLING DEVICE
                              Filed March 25, 1940
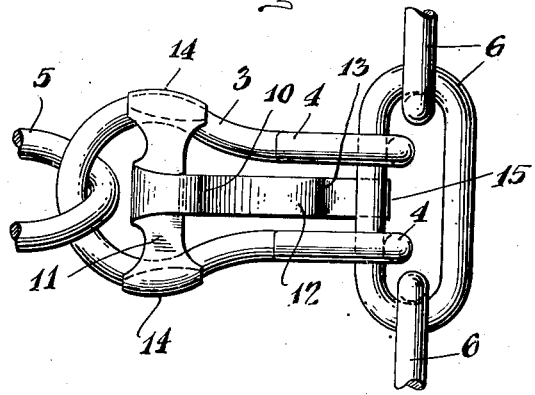
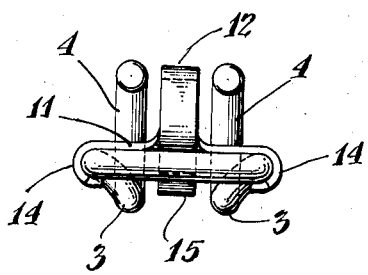
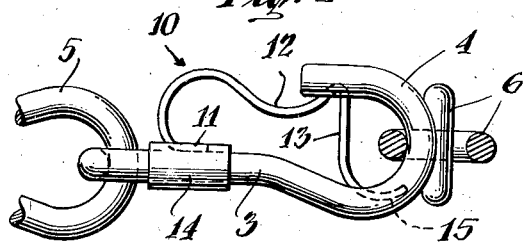
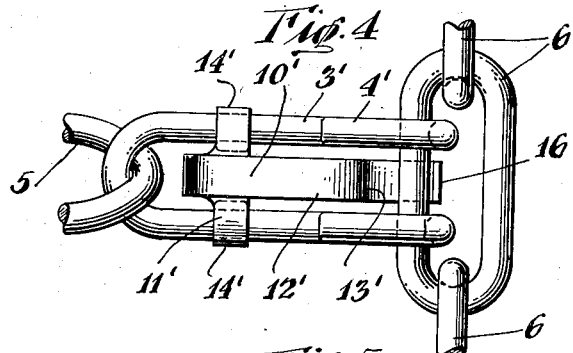
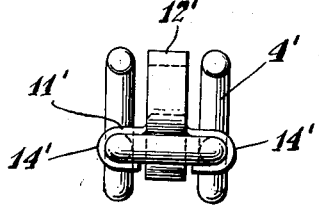
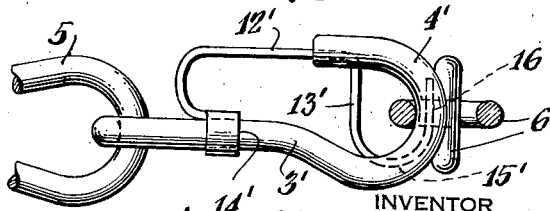
INVENTOR
John Shearman Donaldson
BY
Arthur L. Kent
his ATTORNEY Patented Oct. 21, 1941

2,260,215

UNITED STATES PATENT OFFICE 2,260,215

COUPLING DEVICE

John Shearman Donaldson, St. Albans, N. Y.

Application March 25, 1940, Serial No. 325,714

5 Claims. (Cl. 24—236)

This invention relates to a locking device for preventing a hook from becoming disconnected from a chain link, ring, rod or the like. The object of the invention is to provide hooks with locking means which shall be effective for preventing accidental disconnection of the hook, while at the same time the hook may be readily attached to or disconnected from the link or the like without the use of any tool. The invention has been made especially with the idea of its application to the hooks of anti-skid chains for wheel tires the cross-chains of which are customarily connected to the side chains by means of hooks, the hook ends of which after connection are bent down to prevent the hooks from becoming disconnected. When these cross-chains through wear break in two the chain pieces have to be removed and new cross-chains substituted. The bent hooks can be disconnected from the side chains only with the use of tools intended for that purpose, and then only with difficulty and considerable inconvenience. Use of the locking device of the present invention avoids all need of bending the hook ends, and makes it possible to quickly and easily disconnect broken cross-chains by hand and to quickly and easily attach new cross-chains by hand, avoiding entirely the use of any tool. An additional advantage is that instead of the hooks being semi-hard so that the ends may be bent for locking and unlocking the hooks, they may be fully hardened to the point of their greatest resistance to bending or breaking, thus greatly increasing the resistance of the hooks to deformation in use.

While the invention will be illustrated and particularly described as applied to tire chains, it is to be understood that it is also suitable for and intended for other uses.

In the accompanying drawing—

Fig. 1 is a plan view of a tire chain hook provided with a locking device according to the invention, the hook being connected at its loop end to the end link of a cross-chain and at its hook end to a link of a side chain;

Fig. 2 is a side view of the parts shown in Fig. 1 with the side chain link to which the hook is connected shown in section;

Fig. 3 is an end view of the hook and locking device looking from the left of Fig. 1; and Figs. 4, 5 and 6 are views similar to Figs. 1, 2 and 3, respectively, except that they show a hook of slightly different form and the locking device as of modified form to suit the hook.

Referring to the drawing, and first to Figs. 1, 2 and 3, the hook 3 as shown in these figures is of a well-known form used for tire chains made of strong wire or light rod stock bent to form twin prongs or hook ends 4 extending from a looped shank, the diameter or spread of the loop of which is substantially greater than the spacing of the two hook ends so that the sides of the shank diverge toward the loop end to the width of the loop. The loop being open, the hook can be threaded into an end link 5 of the cross-chain, and the cross-chain is connected to the side chain by hooking the hook ends of the hook into one of the links 6 of the side chain.

The locking device 10 comprises a part 11 for attachment to the shank of the hook and a forwardly extending spring finger 12 having a part 13 which extends at right angles, or approximately so, to the shank of the hook and serves when in its normal position as an abutment closing the hook opening. When the hook is an open-loop twin-prong hook, the locking device is most desirably made to be detachably attached thereto so as to avoid interference with the threading of the hook into the cross-chain link or removing it therefrom, which would result from having the locking device permanently attached to the sides of the shank of the hook. The part 11 of a detachable locking device for use with a hook of the shape shown in Figs. 1 to 3 is made as a cross-piece having flanged ends 14 curved to pass partly around and fit the diverging sides of the shank of the hook, and the abutment part 13 of the spring finger 12 extends between the hook ends, closing the hook opening when in normal position as shown in Fig. 2, extending most desirably entirely across the opening as shown.

After the hook has been threaded into the end link 5 of the cross-chain, the locking device is attached to the hook by sliding its cross-piece 11 along on the shank of the hook until its flanged ends 14 are firmly seated on the diverging sides of the shank. The cross-chain may then be connected to the side chain by pressing the side of the side chain link 6 against the spring finger 12 so as to flex it downward, thereby moving the abutment 13 downward to open the hook opening sufficiently to permit the side of the link to pass, and then by relative movement of the hook and link causing the side of the link to enter to the position shown in the figures. The abutment, after the side of the link has passed it, returns to its normal position shown in Fig. 2, thereby closing the hook opening and thereafter serves to prevent accidental disconnection of the hook from the link. To disconnect the hook from the side chain link when desired it is only necessary to depress the spring finger so as to permit the side of the link to pass between the abutment and the hook ends out of the hook opening.

The pieces of a broken cross-chain may thus be easily removed without the use of any tool, and then, after detaching the locking devices from the hooks, the hooks may be disconnected from the cross-chain pieces and threaded into the end links of a new cross-chain.

From the lower end of the abutment 13 a stop piece 15 extends between the hook ends. This stop piece serves to prevent the side of link 6 from passing beneath the abutment if the spring finger should be pushed upward, and, by engagement with the tire when the chain is in use, to prevent the spring finger from being pushed downward sufficiently to permit the link side from escaping past the upper end of the abutment.

Figs. 4, 5 and 6 show the locking device 10' of a slightly modified form adapted for and as applied to a different form of twin-prong hook which is also in common use for tire chains, this hook 3' differing from the hook of Figs. 1 to 3 only in that the two sides of the shank of the hook extend straight from the hook ends parallel with each other. The cross-piece 11' of the locking device is, therefore, made shorter than in the form of the device shown in Figs. 1, 2 and 3, and its flanged ends 14' are shaped to fit with a sliding fit about the parallel side pieces of the shank; and in attaching the locking device to the hook, the cross-piece is threaded over the hook ends and then slid along on the shank of the hook to the position shown in Figs. 4 and 5. The spring finger 12' has extending upward from its stop piece 15' an end piece 16 which is parallel, or approximately so, to the abutment 13' and spaced therefrom so that it will extend between the two sides of the link 6 to which the hook is connected. This end extension 16 of the spring finger thus serves by engagement with the side of the link to limit backward movement of the spring finger and its sliding cross-piece 11' on the shank of the hook, thereby preventing the abutment 13' from being moved so far backward as to permit the link side from escaping from the hook opening, and forward movement of the locking device is limited by engagement of the abutment with the side of the link. As the device for a straight shank hook shown in these figures has to be attached to the hook by threading its cross-member over the hook ends, the flanged ends 14' may be extended and welded or otherwise secured together if desired for increasing the strength of the attaching part.

The locking device is best made of spring steel or other suitable spring metal by stamping and forming from annealed sheet stock and then tempering, but might, of course, be formed otherwise and of other suitable material.

What is claimed is:

1. A coupling, comprising a hook having twin hook ends extending from a looped shank, and a locking device having a part detachably attached to the shank of the hook and a forwardly extending spring finger shaped to provide at its forward end between the hook ends an abutment which in its normal position closes the hook opening and which has a stop piece extending from its lower end.

2. A coupling, comprising a hook having twin hook ends extending from a looped shank, and a locking device having a part attached to the shank of the hook and a forwardly extending spring finger shaped to provide at its forward end between the hook ends an abutment which in its normal position closes the hook opening and which has a stop piece extending from its lower end.

3. A coupling, comprising a hook having twin hook ends extending from a looped shank the sides of which diverge toward the loop end; and a detachable locking device comprising a cross-piece having flanged ends formed to fit the diverging sides of the shank, a forwardly extending spring finger shaped to provide at its forward end between the hook ends an abutment which in its normal position closes the hook opening and which has a stop piece extending from its lower end.

4. A coupling, comprising a hook having twin hook ends extending from a looped shank having parallel sides; and a detachable locking device comprising a part formed to slide on the shank, and a forwardly extending spring finger shaped to provide at its forward end between the hook ends an abutment which in its normal position closes the hook opening and having extending from the lower end of the abutment a stop piece and from the outer end of the stop piece an upwardly extending end piece spaced from the abutment.

5. A locking device for preventing a hook having twin hook ends extending from a looped shank from becoming unhooked from a link or the like, comprising a part formed for detachable attachment to the shank of the hook and a spring finger extending therefrom shaped to provide an abutment to lie between the hook ends and in its normal position to close the hook opening and a stop piece extending from the abutment.

JOHN SHEARMAN DONALDSON.